Sept. 9, 1924.  H. S. WOOD  1,507,945
DRYING APPARATUS
Filed Jan. 27, 1923

INVENTOR:
Harry S. Wood
BY Wallace White ATT'Y

Patented Sept. 9, 1924.

1,507,945

UNITED STATES PATENT OFFICE.

HARRY SIDNEY WOOD, OF LONDON, ENGLAND.

DRYING APPARATUS.

Application filed January 27, 1923. Serial No. 615,230.

*To all whom it may concern:*

Be it known that HARRY SIDNEY WOOD, a subject of the King of Great Britain, residing at London, England, has invented certain new and useful Improvements in Drying Apparatus, of which the following is a specification.

This invention relates to a drying apparatus which although more particularly adapted for drying clothes can be also used with advantage for any wet textile goods, vegetables and other foodstuffs, veneers and other material which require drying by means of heated air.

The main object of the present invention is to provide a drying chamber with air inlet and air extraction ducts provided with heating means whereby a current of heated air is admitted into the said chamber and is extracted from same without the aid of any mechanical means. A further object is to so arrange and combine the aforesaid air inlet and extraction ducts with respect to the drying chamber that the aforesaid current of heated air is brought into contact with the clothes or other articles to be dried and the moisture laden air is drawn into the extraction duct and led to the exterior of the apparatus. A still further object is to provide dampers or other controlling means in the extraction duct so that, in order to economize heat, when the clothes or other articles are nearly dry or are "airing" the current of heated air ascending in the said duct may be partly or wholly diverted into the drying chamber instead of passing into the atmosphere and furthermore so that only the upper part of the drying chamber may if desired be used for drying purposes.

These and other objects and advantages of the invention will be more readily apparent from the following description when read in conjunction with the accompanying sheet of drawings the novel features being pointed out in the claims.

In the said drawings:—

Figure 1:
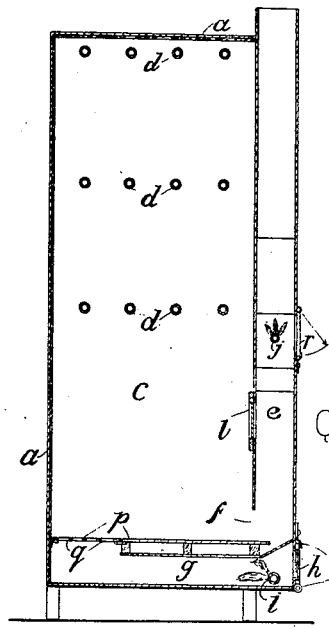

Figure 1 is a sectional elevation.

Figure 2:
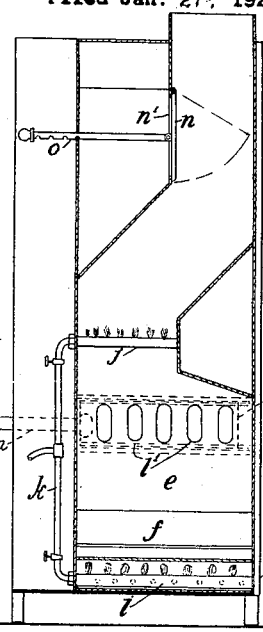
Figure 4:
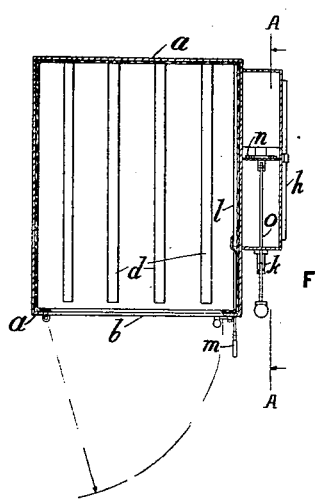

Figure 2 a section on the line A—A of Figure 4.

Figure 3:
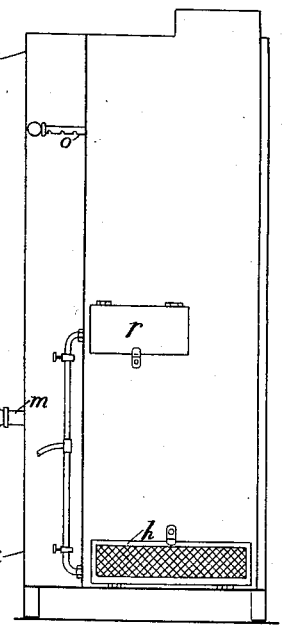

Figure 3 a side elevation.

Figure 4 a sectional plan, and

Figure 5:
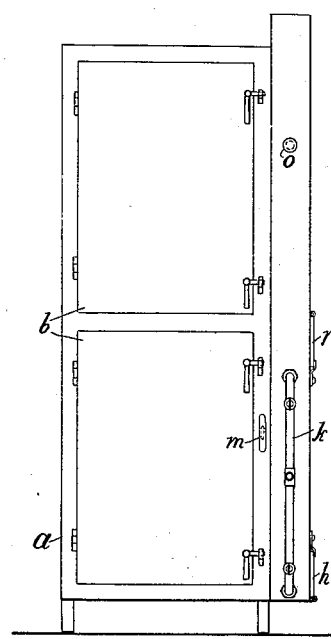

Figure 5 a front elevation.

Similar reference characters relate to like parts in all the figures of the drawings on referring to which it will be observed that in the example illustrated which is more particularly adapted for drying clothes the apparatus comprises a cabinet $a$ constructed preferably of steel, lined with a material which is a non-conductor of heat and provided with a door or doors $b$. $c$ is the drying chamber provided with a series of rods $d$ arranged at various heights, or other suitable devices for the suspension of the clothes to be dried, and $e$ an air extraction duct placed at the side of the chamber $c$ the bottom of the said duct communicating with the chamber $c$ by means of the passage $f$ and the top thereof being open to the atmosphere. $g$ is the air inlet duct the entrance to which is protected by the door $h$ and within which at its forward end and also in the extraction duct $e$ are placed suitable heating media which may be electricity, gas, steam heated surfaces, oil or petrol but in the example shewn comprise the gas burners $i$ and $j$ fed by the pipe $k$ which communicates with the usual service main or other convenient source of gas supply. $l$ is a damper controlling a series of openings $l'$ in the inner wall of the duct $e$ which damper is operated by the rod $m$ and $n$ a damper operated by the rod $o$ and controlling another opening $n'$ similarly placed but toward the upper end of the duct $e$ both of said openings communicating with the chamber $c$. The purpose of these dampers will be described hereafter.

$p$ is a false floor or baffle which is provided with a fine mesh grid or grating as shewn at $q$ and is arranged above the air inlet duct $g$ and $r$ a door giving access to the burner $j$ in the duct $e$.

The construction of the apparatus shewn having been described the operation of drying thereby will now be indicated.

The wet clothes or other articles to be dried are suspended on the rods $d$, (obviously metal or wood perforated or lattices trays or shelves on which the articles may be placed may be used instead of or in conjunction with the rods $d$) and the burners $i$ and $j$ are ignited. The air entering through the door $h$, which is perforated or formed with a gauze front, is heated by means of the burner $i$ and passes along the duct $g$ and upwardly through the grating $q$ in the floor $p$ into the chamber $c$ in which it rises and mingling with the clothes therein effectually dries the same. The air in the extraction duct $e$ heated by the burner *j* rises and a suction effect is thus produced which draws the moisture-laden air descending in the chamber *c* through the passage *f* into the extraction duct *e* from whence it passes into the atmosphere through the top open end thereof.

It may sometimes be desirable when only the top of the chamber *c* is in use, that is for example when only the two upper sets of rods *d* are occupied, to economize heat and this can be readily effected by opening the damper *l* by means of the rod *m* by which means the air is extracted at a higher level into the extraction duct *e* through the openings *l'* in the inner wall of the said duct controlled by the damper *l*.

A further means of economy in heat is provided by the damper *n*. When the articles in the chamber *c* are nearly dry or only require "airing" the damper *n* by means of the rod *o* may be opened and thus permit the heated air rising in the extraction duct *e* to pass back, to a greater or less degree according to the extent to which the damper is opened, into the chamber *c* to be used again for drying purposes instead of passing into the atmosphere through the top of the duct *e*.

What I claim is:—

1. A drying apparatus comprising in combination, a drying chamber means for suspending clothes in said chamber, a duct for admitting air to said chamber, a second duct placed at the side of said drying chamber that is provided with a passage at the bottom thereof communicating with said second duct, heating means disposed in said first named duct for heating the air admitted to said drying chamber and a second heating means disposed in said second duct for drawing the heated air from said drying chamber into said second duct through the aforesaid communicating passage.

2. A drying apparatus comprising in combination, a drying chamber, means for suspending clothes in said chamber, a duct for admitting air to said chamber, a false floor arranged above said duct and provided with a grating a second duct placed at the side of said chamber that is provided with a passage at the bottom thereof also above said first named duct and communicating with said second duct, heating means disposed in the forward end of said first named duct for heating the air admitted to said drying chamber through the grating in said false floor and a second heating means disposed in said second duct for drawing the heated air from said drying chamber into said second duct through the aforesaid communicating passage.

3. A drying apparatus comprising in combination, a drying chamber, means for suspending clothes in said chamber, a duct for admitting air to said chamber, a second duct placed at the side of said drying chamber that is provided with a passage at the bottom thereof communicating with said second duct, the inner wall of said second duct being provided with openings communicating with said drying chamber, dampers controlling said openings, heating means disposed in said first named duct for heating the air admitted to said drying chamber and a second heating means disposed in said second duct for drawing the heated air from said drying chamber into said second duct through the aforesaid communicating passage.

4. A drying apparatus comprising in combination, a drying chamber, means for suspending clothes in said chamber, a duct for admitting air to said chamber, a second duct placed at the side of said drying chamber that is provided with a passage at the bottom thereof communicating with said second duct, heating means disposed in said first named duct for heating the air admitted to said drying chamber, a second heating means disposed in said second duct for drawing the heated air from said drying chamber into said second duct through the aforesaid communicating passage, the inner wall of said second duct being provided with an opening situated between said heating means and said communicating passage and communicating with said drying chamber, a damper controlling said opening and means for operating said damper.

5. A drying apparatus comprising in combination, a drying chamber, means for suspending clothes in said chamber, a duct for admitting air to said chamber, a second duct placed at the side of said drying chamber that is provided with a passage at the bottom thereof communicating with said second duct, heating means disposed in said first named duct for heating the air admitted to said drying chamber, a second heating means disposed in said second duct for drawing the heated air from said drying chamber into said second duct through the aforesaid communicating passage, the inner wall of said second duct being provided with one opening situated between said heating means and said communicating passage and communicating with said drying chamber and a second opening near the upper end of said inner wall also communicating with said drying chamber, dampers controlling each of said openings and means for operating said dampers.

In testimony whereof I affix my signature.

HARRY SIDNEY WOOD.